United States Patent [19]

Edwards

[11] Patent Number: 5,512,627
[45] Date of Patent: Apr. 30, 1996

[54] ACRYLIC/LACTAM RESIN COMPOSITION AND METHOD OF PRODUCTION SAME

[76] Inventor: Bill R. Edwards, 401 E. High St., Baldwin City, Kans. 66006

[21] Appl. No.: 444,606

[22] Filed: May 19, 1995

Related U.S. Application Data

[60] Continuation of Ser. No. 405,118, Mar. 16, 1995, which is a division of Ser. No. 136,632, Oct. 14, 1993, Pat. No. 5,399,593.

[51] Int. Cl.$^6$ .............................. C08K 3/04; C08G 69/08; C08G 69/14
[52] U.S. Cl. ........................ 524/495; 524/549; 528/313; 528/323; 528/326
[58] Field of Search .................................. 524/495, 549; 528/313, 323, 326

[56] References Cited

U.S. PATENT DOCUMENTS

| | | |
|---|---|---|
| 3,669,910 | 6/1972 | English et al. . |
| 4,945,122 | 7/1990 | Edwards . |
| 5,023,313 | 6/1991 | Edwards . |
| 5,026,738 | 6/1991 | Meinhard . |
| 5,045,613 | 9/1991 | Edwards . |
| 5,134,210 | 7/1992 | Edwards . |
| 5,145,903 | 9/1992 | Duncan . |
| 5,243,003 | 9/1993 | Edwards . |
| 5,250,596 | 10/1993 | Edwards . |
| 5,252,644 | 10/1993 | Edwards . |
| 5,272,230 | 12/1993 | Edwards . |
| 5,280,049 | 1/1994 | Wolf et al. . |

Primary Examiner—Morton Foelak
Attorney, Agent, or Firm—Dunlap & Codding

[57] ABSTRACT

An acrylic/lactam monomer based polymeric resin is provided which has excellent weatherability, outstanding transparency and optical clarity, improved heath and solvent resistance, as well as improved impact strength. The acrylic/lactam monomer based polymeric resin is formulated by the catalytic activation at ambient temperature of a polymerization syrup which contains from about 300 to about 2970 parts by volume of an acrylic monomer, from about 30 to about 2700 parts by volume of a lactam monomer, from about 0.3 parts to about 40 parts by volume of a mercaptan chain transfer agent and from about 0.3 to about 40 parts by volume of a crosslinking agent capable of crosslinking the acrylic monomer and the lactam monomer. To prevent further polymerization of the polymeric constituents of the polymerization syrup, as well as to enhance the shelf life of the polymerization syrup, an effective amount of a polymerization inhibitor and an ultraviolet light stabilizer are incorporated into the polymerization syrup. The crosslinking of the acrylic monomer and the lactam monomer is carried out at ambient temperature and atmospheric pressure.

10 Claims, No Drawings

ACRYLIC/LACTAM RESIN COMPOSITION AND METHOD OF PRODUCTION SAME

CROSS REFERENCE TO RELATED APPLICATIONS

This application is a continuation application under 37 CFR 1.60 of application Ser. No. 08/405,118, filed Mar. 16, 1995, entitled "ACRYLIC/LACTAM RESIN COMPOSITIONS AND METHOD OF PRODUCING SAME"; which is a divisional application of U.S. Ser. No. 08/136,632, filed Oct. 14, 1993, entitled "ACRYLIC/LACTAM RESIN COMPOSITIONS AND METHOD OF PRODUCING SAME", now U.S. Pat. No. 5,399,593, issued Mar. 21, 1995.

BACKGROUND OF THE INVENTION

1. Field of the Invention

The present invention relates to polymeric resin compositions, and more particularly, but not by way of limitation, to acrylic/lactam monomer based resin compositions curable at ambient temperatures and atmospheric pressure. In one aspect the present invention relates to a polymerization syrup formulated at ambient temperature and atmospheric pressure from an acrylic monomer and a lactam monomer which, upon activation, provides a resinous composition curable at ambient temperature and atmospheric pressure.

2. Brief Description of Prior Art

Acrylic resins formed predominantly of methyl methacrylate have heretofore been known. Because acrylic resins formed of methyl methacrylate are linear polymers, the polymers have exhibited good weatherability and transparency. However, such polymers have suffered from disadvantages in that they are deficient in resistance to heat, solvents, shock, and surface hardness. Because of these deficiencies, the prior art is replete with acrylic based resin compositions wherein the base polymer, i.e., methyl methacrylate, is copolymerized with dissimilar monomers in an effort to overcome the before-stated deficiencies of the acrylic resins.

While various resin compositions have been proposed for improving the heat and solvent resistance, as well as the surface hardness of acrylic based resins, such modified resin compositions have a tendency to become discolored on heating and the desired properties of weatherability and optical clarity are often sacrificed or reduced. Many of the problems inherent with the prior art acrylic based resin compositions have been overcome by the use of the polymerization syrups disclosed in my U.S. Pat. Nos. 5,023,313; 5,045,613; 4,945,122; and 5,243,003.

While acrylic based resin composition formulated in accordance with the teachings of my above-referenced U.S. Patents have generally exhibited improved physical and chemical properties, new and improved acrylic based resin compositions are desired which exhibit improved color, optical clarity and impact resistance and which do not require post curing, while at the same time possessing desired properties which allow such resin compositions to be foamed, filled with particulate fillers or cast into thick articles without air entrapment. It is to such an acrylic based resin composition that the present invention is directed.

SUMMARY OF THE INVENTION

In accordance with the present invention, acrylic/lactam polymeric resins are provided having improved color, optical clarity, thermal shock and impact resistance, while at the same time possessing desired properties which allow such resin compositions to be foamed, filled with particulate fillers or cast into thick articles without air entrapment.

The acrylic/lactam resin compositions of the present invention are produced by activating a polymerization syrup formulated by admixing, at ambient temperature and atmospheric pressure, from about 300 to about 2970 parts by volume of an acrylic monomer, from about 30 to about 2700 parts by volume of a lactam monomer, from about 0.3 parts to about 40 parts by volume of a mercaptan chain transfer agent and from about 0.3 to about 40 parts by volume of a crosslinking agent capable of crosslinking the acrylic monomer and the lactam monomer. The resulting admixture is maintained at ambient temperature and atmospheric pressure for a period of time effective to produce a polymerization syrup having a polymeric constituent of a desired molecular weight. To prevent further polymerization of the polymeric constituents of the polymerization syrup, as well as to enhance the shelf life of the polymerization syrup, an effective amount of a polymerization inhibitor and a ultraviolet light stabilizer are incorporated into the polymerization syrup.

To produce a polymeric resin from the polymerization syrup, the polymerization syrup is first initiated or activated so as to permit catalytic activation of the polymerization syrup. If desired, a particulate filled resin composition can be provided by incorporating from about 10 to about 90 parts by weight of a particulate filler into the catalyst initiated polymerization syrup.

An object of the present invention is to provide an acrylic/lactam resin composition having improved color, optical clarity and thermal shock and impact resistance.

Another object of the present invention, while achieving the before-stated object, is to provide an acrylic/lactam resin composition which does not require post curing, while at the same time possessing desired properties which allow such resin compositions to be foamed, filled with particulate fillers or cast into thick articles without air entrapment.

Yet another object of the present inventions, while achieving the before-stated objects, is to provide a polymerization syrup for an acrylic/lactam resin composition which, when activated, is curable at ambient temperature and atmospheric pressure.

Other objects, advantages and features of the present invention will become apparent upon reading of the following detailed description in conjunction with the appended claims.

DETAILED DESCRIPTION

The present invention provides an acrylic/lactam monomer based polymerization syrup which, upon activation produces a polymeric resin composition curable at ambient temperature and atmospheric pressure. The polymerization syrup is formulated by admixing, at ambient temperature and atmospheric pressure, an acrylic monomer, a lactam monomer, a mercaptan chain transfer agent and a crosslinking agent, and maintaining the resulting polymerization admixture at ambient temperature and atmospheric pressure for a period of time effective to produce a polymerization syrup having a desired viscosity.

The amount of the acrylic monomer, the lactam monomer, the mercaptan chain transfer agent and the crosslinking agent employed in the formulation of the polymerization syrup can vary widely, and will generally depend on the properties desired in the polymeric resin produced from the polymerization syrup. Generally, however, the polymerization mixture contains from about 300 to about 2970 parts by volume of an acrylic monomer, from about 30 to about 2700 parts by volume of a lactam monomer, and minor effective amounts of a mercaptan chain transfer agent and an effective amount of a crosslinking agent capable of crosslinking the acrylic monomer and the lactam monomer.

Once the polymerization syrup containing a polymeric constituent of a desired molecular weight has been produced, an effective amount of a polymerization inhibitor is incorporated into the polymerization syrup to prevent further polymerization of the polymeric constituent, as well as to enhance the shelf life of the polymerization syrup.

In formulating the polymerization syrup of the present invention, any suitable acrylic monomer represented by the formula

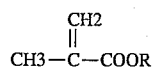

wherein R is an alkyl moiety containing 1 to about 18 carbon atoms, more desirably from 1 to 8 carbon atoms, can be employed as the acrylic monomer, provided that the acrylic monomer is a liquid at ambient temperature and atmospheric pressure and is capable of crosslinking with the lactam monomer. Examples of alkyl moieties satisfying the definition for R of the before-described formula include methyl, ethyl, propyl, butyl, pentyl, hexyl, heptyl, octyl, nonyl, decyl, undecyl, dodecyl, tetradecyl, pentadecyl, hexadecyl, heptadecyl, octadecyl and the like. Examples of acrylic monomers satisfying the above-defined formula include methyl methacrylate, ethyl methacrylate, n-butyl methacrylate, 2-ethylhexyl methacrylate, cyclohexyl methacrylate, ω-hydroxyalkyl methacrylates, and the like.

The lactam monomers which can be employed in the formulation of the polymerization syrup of the present invention are the lactam monomers which are compatible with the above-defined acrylic monomers, which are capable of crosslinking with such acrylic monomers at ambient temperature and atmospheric pressure and, when admixed with the acrylic monomer, produces a liquid mixture. Generally, lactam monomers containing 3 to 12 or more carbon atoms in the lactam ring satisfy the before-stated requirements for lactam monomers which can be employed in the formulation of the polymerization syrup of the present invention. Examples of such lactam monomers are pyrrolidone, piperidone, ε-caprolactam, γ-caprolactam, enantholactam, caprylolactam and laurolactam.

The amount of the mercaptan chain transfer agent employed in the formulation of the polymerization syrup of the present invention can vary widely but will generally be present in an amount of from about 0.3 to about 40 parts by volume per 3000 parts by volume of the acrylic and lactam monomers. Any mercaptan capable of functioning as a chain transfer agent for the monomeric constituents of the polymerization syrup can be employed, such as, isooctyl-3-mercaptopropionate, n-dodecyl ethylene glycol dimercaptoacetate, n-butyl mercaptopropionate, n-octyl mercaptan, n-dodecyl mercaptan and the like.

The amount of crosslinking agent required to effect the desired crosslinking of the acrylic and lactam monomers is generally from about 0.3 to about 40 parts by volume per 3000 parts by volume of the acrylic and lactam monomers, the required amount depending on the efficiency of the crosslinking agent. That is, for a strong crosslinking agent the concentration of the crosslinking agent required will be less than when a weak crosslinking agent is selected.

Any crosslinking agent capable of effecting the desired crosslinking of the acrylic and lactam monomers at ambient temperature and atmospheric pressure can be employed as the crosslinking agent in the formulation of the polymerization syrup of the present invention. Such crosslinking agents are well known in the art and include ethylene glycol dimethacrylate, allyl methacrylate, allylacrylate, ethylene glycol diacrylate, polyethylene glycol dimethacrylate, diethylene glycol dimethacrylate, triethylene glycol dimethacrylate and the like.

As previously stated, the polymerization mixture of the acrylic monomer, the lactam monomer, the chain transfer agent and the crosslinking agent is maintained at ambient temperature and atmospheric pressure for a period of time effective to provide a polymerization syrup having a desired viscosity. The viscosity of the polymerization syrup, which is indicative of the molecular weight of the polymeric constituent present in the polymerization syrup, can vary widely. However, for most applications, the polymerization mixture is maintained at ambient temperature and atmospheric pressure until the polymerization syrup has a predetermined viscosity within the range of from about 100 to about 2000 centipoise.

The time required to produce a polymerization syrup having a desired viscosity will vary widely depending upon the molecular weight desired for the polymeric constituent of the syrup. However, for most applications, a polymerization syrup having a polymeric constituent can be achieved when the polymerization mixture is maintained at ambient temperature and atmospheric pressure for a period of time of at least about 6 hours, and more desirably from about 24 to about 96 hours.

Once the desired amount of polymerization of the monomers present in the polymerization mixture has occurred, the polymerization inhibitor is incorporated into the polymerization syrup to prevent further crosslinking or polymerization of the polymeric constituent. The amount of polymerization inhibitor incorporated into the polymerization syrup can vary widely but will generally be in an amount sufficient to provide the polymerization syrup with from about 0.05 to about 20 parts by volume of the polymerization inhibitor per 3000 parts by volume of the polymerization syrup.

Any suitable polymerization inhibitor which is compatible with the polymeric constituent of the polymerization syrup and capable of preventing further crosslinking of the polymeric constituent of the polymerization syrup can be employed. However, desirable results have been obtained wherein the polymerization inhibitor is methyl ethyl hydroquinone, 2-2hydroxy-5-methylphenylbenzotriazole or an alkyl phosphites, such as triisooctyl phosphite, tris-2-chloroethyl phosphite, tributyl phosphite, triisopropyl phosphite, tris-2-ethylhexyl phosphite, trimethyl phosphite, triethyl phosphite and the like.

To enhance ultraviolet light stabilization of the polymerization syrup, it is often desirable to incorporate into the polymerization syrup an effective minor amount of an ultraviolet light stabilizer. While the amount of ultraviolet light stabilizer employed can vary widely, generally the ultraviolet light stabilizer will be employed in an amount of from about 1 to about 20 parts by volume per 3000 parts by volume of the polymerization syrup.

Ultraviolet light stabilizers are well known in the art. Examples of such ultraviolet light stabilizers are 2-2'-hydroxy5-methylphenylbenzotriazole, 2-(2H-benzotriazole-2-yl)-4-methylphenyl, 2-(2'-hydroxy-3',6'-di-tert-amylphenyl)benzotriazole, beta-3-(3-(2H-benzotriazol-2-YL)-4-hydroxy-5-tert-butylphenyl), propionic acid, methyl ether, polyethylene glycol 300 and hindered tertiary amines, such as bis(1,2,2,6,6-pentamethyl-4-piperidinyl) sebacate.

To produce a polymeric resin from the polymerization syrup of the present invention, an initiator is employed to initiate activation of the polymerization syrup. The polymerization syrup is initiated by exposure to ultraviolet light, heat or by the addition of from about 0.05 to 20 parts by volume, based on 3000 parts by volume of the polymerization syrup, of an initiator capable of initiating catalytic curing of the resin. Examples of compounds which may be used as an initiator are t-butyl peroxymaleic acid, N,N-dimethylacetoacetamide, mixtures of N,N-dimethylacetoacetamide and quaternary ammonium compounds, such as benzyl (C12-C18) alkyl dimethyl isopropanol, and the like.

The initiated polymerization syrup can be activated and catalyzed by the addition of a catalytic amount of a polymerization catalyst capable of activating the polymerization syrup, by the exposure to ultraviolet light or visible light or any combination thereof. Upon activation of the polymerization syrup, the resulting polymeric resin composition is curable at ambient temperature and atmospheric pressure.

Any polymerization catalyst capable of activating the polymerization syrup can be employed in the preparation of the acrylic/lactam monomer based resin compositions of the present invention. However, desirable results have been obtained wherein the polymerization catalyst is a toluene solution containing 25% or 75% t-butyl peroxymaleic acid, t-butyl peroxymaleic acid, a mixture containing 90 weight percent t-butyl peroxymaleic acid, 5 weight percent 2-(2'-hydroxy-5-methylphenyl)benzotriazole and 5 weight percent silicon, or a quaternary ammonium salt generally known in the industry as "fabric softeners". When employing a toluene solution of t-butyl peroxymaleic acid as the polymerization catalyst, the concentration of the t-butyl peroxymaleic acid can vary widely. However, desirable results have been obtained where the toluene solution contains either 25% or 75% t-butyl peroxymaleic acid.

The quaternary ammonium salts which may be used as the catalyst to activate the polyacrylic/polylactam polymerization syrup of the present invention are generally known in the industry as "fabric softeners" and include the following:

Dialkyldimethylammonium chlorides, such as dicocodimethylammonium chloride and ditallow dimethylammonium chloride;

Dialkyldimethylammonium methylsulfates;

Alkyltrimethylammonium chlorides, such as soya trimethylammonium chloride, hydrogenated tallow trimethylammonium chloride, palmityltrimethylammonium chloride, cocotrimethylammonium chloride, tallow trimethylammonium chloride, and benzyltrimethylammonium chloride; and Alkyldimethylbenzylammonium chlorides, such as dimethyl-alkyl (C14–C18) benzylammonium chloride and dimethylalkyl (C12–C16) benzylammonium chloride.

The amount of the catalyst employed to catalyze the polymerization syrup can vary widely and will be dependent to a large degree upon the acrylic and lactam monomers employed in the formulation of the polymerization syrup, as well as the nature of the catalyst chosen. However, generally, the amount of the catalyst employed to catalyze the polymerization syrup will be an amount sufficient to provide from about 0.1 to about 15 parts by volume of the catalyst, based on the amount of monomers present in 3000 ml of the polymerization syrup.

It may be desirable to incorporate an effective minor amount of an internal mold release agent into the polymerization syrup to enhance mold release. The amount of the internal mold release agent can vary widely, but will generally be in an amount sufficient to provide from about 0.01 to about 2 parts by volume of the internal mold release agent per 3000 parts of the polymerization syrup.

Any suitable internal mold release agent can be employed provided that the internal mold release agent is compatible with the polymeric constituents present in the polymerization syrup. For example, desirable results have been obtained wherein the internal mold release agent is a surfactant, and wherein the surfactant is an anionic or nonionic surfactant which is compatible with the polyacrylic/polylactam copolymer and which does not reduce the transparency of the resulting polymeric resin. Examples of suitable anionic surfactants include:

sodium alkyl sulfate, such as sodium octylsulfate, sodium laurylsulfate, sodium stearylsulfate;

sodium alkylbenzenesulfates, such as sodium dodecylbenzenesulfate; sodium alkylsulfonates, such as sodium cetylsulfonate and sodium stearlylsulfonate;

sodium dialkyl sulfosuccinates, such as sodium dioctyl sulfosuccinate, and the like.

Examples of nonionic surfactants include:

polyethyleneglycol alkyl ethers, such as polyethyleneglycol oleyl ether, polyethyleneglycol lauryl ether, and the like;

polyethyleneglycol alkylphenyl ethers, such as polyethyleneglycol nonylphenyl ether;

higher fatty acid esters of polyethyleneglycol, such as oleic acid ester of polyethyleneglycol, stearic acid ester of polyethyleneglycol, lauric acid ester of polyethyleneglycol, and the like;

polyethyleneglycol polypropyleneglycol ether;

sorbitan fatty acid esters, such as sorbitan monolaurate, sorbitan monostearate, and the like;

polyethyleneglycol sorbitan fatty acid esters, such as polyethyleneglycol sorbitan monolauric acid ester, polyethyleneglycol sorbitan monooleic acid ester, phosphoric acid esters of polyethyleneglycol;

and phosphoric acid esters of alkylpolyethyleneglycol and the like.

The surfactants listed above are merely illustrative of anionic and nonionic surfactants which can be employed as the internal mold release agent in the formulation of the polymerization syrup of the present invention. However, desirable results have been obtained wherein the surfactant is sodium dioctyl sulfosuccinate.

A polymerization syrup formulated as set forth above (whether same incorporates the polymerization inhibitor and/or the mold release agent) provides a polymeric resin composition which can be cured, upon activation, at ambient temperatures and atmospheric pressure. As will more fully be described hereinafter, fillers can be incorporated into the polymerization syrup to provide filled polymeric resins; and the activated polymerization syrup can be foamed to produce foamed articles.

In formulating a particulate-filled article from the polymerization syrup of the present invention, a particulate material is admixed into the polymerization syrup either prior to or during activation of the polymerization syrup. The amount of the particulate matter admixed with the polymerization syrup, as well as the nature of the particulate material, can vary widely and will depend to a large degree on the properties and appearance desired in the cured article. Generally, however, when employing a filler to provide a filled resin composition, the amount of particulate filler admixed with the polymerization syrup will be an amount sufficient to provide from about 10 to about 90 parts by weight of the particulate filler, based on the weight of the polymerization syrup.

The particle size of the particulate filler can vary widely. However, the particulate filler will generally have an average particle size of from about 1 to about 200 microns. Examples of particulated fillers having the desired particle size which can be admixed with the polymerization syrup of the present invention to produce particulate filled resin compositions are aluminum trihydrate, carbon black, gypsum, graphite, iron oxides, and the like.

Foamed articles can also be produced from the polymerization syrup of the present invention. To produce a foamed article, effective amounts of a foaming agent capable of foaming the catalyst activated polymerization syrup, an initiator and a catalyst are admixed with the polymerization syrup. Conventional foaming agents compatible with the polymeric constituents of the polymerization syrup can be employed; and, if desired, surfactants, fillers, pigments and fire retardant compounds may also be introduced into the polymerization syrup either before, simultaneous with or after the addition of the foaming agent, the initator and the catalyst.

The polymerization syrups prepared in accordance with the present invention desirably have a viscosity in the range of from about 100 centipoise to about 2000 centipoise. However, the viscosity of the particular polymerization syrup employed will be dependent upon the properties desired in the end product.

In the formulation of a foamed article, from about 70 to about 200 parts by weight of the polymerization syrup are admixed with from about 4 to about 15 parts by weight of a foaming agent, from about 0.09 to 1.5 parts by weight of an initiator and from about 0.5 to about 20 parts by weight of a catalyst for a period of time effective to provide a substantially homogeneous foamable mixture. As will be apparent, the amount of the polymerization syrup employed in the foamable mixture will depend on the desired properties and characteristics of the foamed article.

As previously stated, any suitable foaming agent compatible with the polymerization syrup and capable of foaming the foamable polymerization mixture may be employed. Illustrative of compounds which may be employed as the foaming agent in the preparation of foamed articles using the polymerization syrup of the present invention are alkali metal hydroxides, alkali metal oxides, alkaline earth metal hydroxides, alkaline earth metal oxides, lead oxide, and a combination thereof. Examples of such alkali metal hydroxides are sodium hydroxide and potassium hydroxide; and examples of such alkaline earth metal hydroxides and alkaline earth metal oxides are calcium hydroxide and magnesium oxide.

Any suitable initiator which is compatible with the foamable polymerization mixture can be employed as the initiator in the formulation of the foamable polymerization mixture. Examples of compounds which may be used as the initator are amines, such as N,N-dimethyl acetoamide, tertiary-butyl peroxymaleic acid, and quaternary ammonium salts.

Any suitable compound capable of activating the initiated foamable mixture can be used as the catalyst to produce a foamed article. Such catalysts have heretofore been described with reference to the catalytic activation of the polymerization syrup.

If desired, a mold release agent, i.e. a surfactant, may also be incorporated into the foamable mixture to effect the "skin" of the foamed article. The amount of surfactant employed can vary widely, but will generally be an amount sufficient to provide the foamable mixture with from about 0.5 to about 20 parts by weight of the surfactant. Examples of surfactants which may be incorporated into the foamable mixture are sodium dioctyl sulfosuccinate, polyoxyethylene-polyoxypropylene glycol, and N-vinyl-2-pyrrolidone and mixtures thereof.

Additionally, a particulate filler may be admixed into the foamable mixture to provide a filled foamed resin composition. The particulate filler may be admixed or shear mixed into the foamable mixture; and the amount of particulate filler employed can vary widely depending on the desired properties of the filled foamed resin composition. Generally, however, the amount of particulate filler incorporated into the foamable mixture is an amount sufficient to provide a filled foamable mixture containing from about 1 to about 300 parts by weight of the particulate filler. The particle size of the particulate filler employed can vary widely and will again depend to a large degree on the properties desired in the filled foam resin composition. Generally, however, the particulate filler will have a particle size of from about 1 to about 200 microns, and more desirably an average particle size of from about 1 to about 100 microns.

Any particulate filler compatible with the foamable mixture can be employed as the particulate filler. Examples of such particulate fillers are alumina trihydrate, carbon black, graphite, gypsum, granite, iron oxide, glass beads, mixtures thereof and the like.

Fire retardants may also be incorporated into the filled foamable mixture if desired. The particular fire retardant, as well as the amount of such fire retardant incorporated into the filled foamable mixture, will depend to a large degree on the properties and characteristics desired of the filled foamed resinous composition and the effect upon the foaming properties of the foamable mixture. Generally, however, the amount of fire retardant compound incorporated into the filled foamable mixture is an amount sufficient to provide from about 2 to about 40 parts by weight of the fire retardant compound in the filled foamable mixture. Examples of fire retardants which are suitable for incorporation into the filled f0foamable mixture are triphenyl phosphate, decabromide phenyl oxide, and tris (2-chloroethyl) phosphite.

Pigments may also be incorporated into the filled foamable mixture. Any suitable pigment can be employed provided that the pigment is compatible with the filled foamable mixture. Such pigments are well known in the art. Thus, no further comments concerning such pigments or their use is believed necessary to enable one to practice the inventive concept disclosed herein.

Articles produced from the foamable mixture as well as the filled foamable mixture have many desirable uses and qualities, including improved physical and chemical properties. Further, such articles have exhibited improved compressive strength, impact resistance, surface hardness, weatherability, chemical and stain resistance and the ability to drive a nail into the foamed resinous composition because of the "wood-like" interior cellular structure.

In order to further illustrate the present invention, the following examples are given. However, it is to be understood that the examples are for illustrative purposes only and are not to be construed as limiting the scope of the subject invention.

EXAMPLE I

A polymerization syrup was prepared by admixing the following constituents:

2500 ml of methyl methacrylate monomer 400 ml of ε-caprolactam monomer 10 ml of isooctyl-3-mercaptopropionate 10 ml of allylmethacrylate The resulting mixture was maintained at ambient temperature and atmospheric pressure for about 78 hours so as to provide a polymerization having a viscosity of about 330 centipoise. The viscosity of the polymerization mixture was periodically measured so that the molecular weight of the polymeric constituent in the polymerization syrup could be determined. When the desired viscosity had been achieved, (i.e., 330 centipoise), the polymerization syrup was then stabilized by the addition of 5 ml tris-2-chloroethyl phosphite, a polymerization inhibitor; and 13 ml of 2-2'-hydroxy-5-methylphenylbenzotriazole was then added to the polymerization syrup to enhance ultraviolet light stabilization.

The polymerization syrup so produced was then placed in a glass container, sealed and stored at ambient temperature and atmospheric pressure. Examinations of the syrup were conducted to determine the integrity of the polymerization syrup during storage. No deterioration of the polymerization syrup was detected during storage periods of up to six (6) months. Thus, the polymerization syrup produced exhibited excellent shelf life and one does not need to refrigerate the polymerization syrup during storage in order to maintain the integrity of the polymerization syrup.

EXAMPLE II

A polymerization syrup formulated in accordance with the procedures of Example I was catalytically activated by the addition of about 3 ml of a toluene based solution containing 25 weight percent t-butyl peroxymaleic acid. The catalyzed polymerization syrup was then poured into molds of various configurations and thicknesses and allowed to cure for about 30 minutes at ambient temperature and pressure. The peak exotherm temperature was monitored during curing and it was noted that the thicker the mold, the higher the peak exotherm temperature.

After curing, the articles were removed from the molds and examined. Each of the articles exhibited improved color, optical clarity and impact resistance. Further, the thick articles were substantially bubble free, indicating no air entrapment during curing.

EXAMPLE III

A polymerization syrup was formulated in accordance with the procedure of Example I with the exception that about 5 ml of methylethylhydroquinone was employed as the polymerization inhibitor in place of the tris-(2-chloroethyl) phosphite. The polymerization syrup containing the methylethylhydroquinone was placed in a dark glass container, sealed and stored at ambient temperature and atmospheric pressure. Examinations of the syrup were conducted to determine the integrity of the syrup during the storage period. No deterioration of the syrup was detected during a three month storage period.

The polymerization syrup was then removed from storage and catalytically activated by the addition of about 3 ml of a toluene based solution containing 75 weight percent t-butyl peroxymaleic acid. The catalyzed polymerization syrup was then poured into molds of various configurations and thicknesses and allowed to cure for about 30 minutes at ambient temperature and pressure. The exotherm temperature was monitored during curing and it was noted that the thicker the mold, the higher the peak exotherm temperature.

After curing, the articles were removed from the molds and examined. Each of the articles exhibited improved color, optical clarity and impact resistance. Further, the thick articles were substantially bubble free, indicating no air entrapment during curing.

EXAMPLE IV

A polymerization syrup was prepared by admixing the following constituents:

7500 ml of methyl methacrylate monomer 1200 ml of ε-caprolactam monomer 30 ml of isooctyl-3-mercaptopropionate 30 ml of allylmethacrylate The resulting mixture was a substantially homogeneous blend and was maintained at ambient temperature and atmospheric pressure for about 78 hours so as to provide a polymerization syrup having a viscosity of about 330 centipoise. When the desired viscosity had been achieved, (i.e., 330 centipoise), the polymerization syrup was then stabilized by the addition of 15 ml tris-(2-chloroethyl) phosphite, a polymerization inhibitor; and 40 ml of 2-(2'-hydroxy-5-methylphenyl)benzotriazole was then added to the polymerization syrup to enhance ultraviolet light stabilization.

10 grams of a catalyst initiator containing 4 parts by weight of N,N-dimethylacetoacetamide and 1 part by weight of benzyl-C12–18-alkyl dimethyl isopropanol (a quaternary ammonium compound) was admixed into the polymerization syrup. 27 pounds of aluminum trihydrite filler was then shear mixed into the polymerization syrup so as to provide a homogeneous blend containing 60 weight percent of the filler and 40 weight percent of the polymerization syrup.

The aluminum trihydrate employed as the filler had an average particle size ranging from 1 micron to about 50 microns. That is, the aluminum trihydrate contained 30 weight percent having an average particle size of 45 to 50 microns, 60 weight percent having an average particle size of 15–20 microns and 10 weight percent have a particle size of about 1 micron.

The shear mixing was carried out until a substantially homogeneous blend of the polymerization syrup and the aluminum trihydrate was achieved. Thereafter, the homogeneous blend was subject to a wetting out period of 30 minutes under a vacuum of 20 inches of mercury so as to remove entrapped air resulting from the shear mixing of the polymerization syrup and the aluminum trihydrate.

The vacuum was then removed and the homogeneous blend substantially free of air was catalyzed by the addition of 126 grams of a catalyst containing 90 weight percent t-butylperoxymaleic acid, 5 weight percent 2-2-azobisisobutylnitrile and 5 weight percent silicon. Care was taken to insure that the catalyst was uniformly dispersed.

The resulting resin was then poured, at room temperature, into a sink mold and the mold was then sealed. The resin was allowed to cure at ambient temperature and atmospheric pressure for 90 minutes. The exotherm temperature of the resin was monitored during the curing of same. A peak exotherm temperature of 205° F. was obtained after thirty minutes. At the end of 90 minutes the cured sink self-released from the mold.

The sink was thereafter removed from the mold and tested using a thermal shock test procedure wherein the sink is repeatedly subjected to cycles of hot and cold water. At the completion of 5400 cycles a matrix crack was observed. However, the standard in the industry for such thermal shock testing is that a material suitable for use as tubs, sinks and the like must withstand 500 cycles for the material to be acceptable in the fabrication of sinks, bath tubs and the like.

EXAMPLE V

A polymerization syrup was formulated in accordance with the procedure of Example I except that the polymerization of the monomers was allowed to continue for a period of about 80 hours so that the polymerization syrup had a viscosity of about 820 centipoise. 2 grams of a foaming agent, i.e. calcium hydroxide, was then admixed with 115 grams of the catalyst activated polymerization syrup, followed by the addition of 1 gram of N,N- dimethyl acetoamide to initiate the polymerization syrup.

Surfactants were then added to the initiated syrup. The surfactants added were 3.2 grams of sodium dioctyl sulfosuccinate, 0.40 grams of polyoxyethylene-polyoxypropylene glycol, and 1.5 grams of a flurochemical surfactant. The surfactants and the initiated syrup were admixed at ambient temperature and pressure to form a homogenous blend; and then 8.8 grams of glass beads filler was added to the homogeneous blend of the initiated polymerization syrup and surfactants.

The resulting particulate filled mixture was then catalyzed by the addition of 1.8 grams of t-butyl peroxymaleic acid. The catalyzed mixture was thoroughly admixed and then poured into a mold at ambient temperature and pressure.

The foamed resinous composition was removed from the mold after curing; and exhibited excellent skin. Additionally, the foamed resinous composition was exceptionally lightweight and exhibited good stain resistance.

EXAMPLE VI

A polymerization syrup was formulated in accordance with the procedure of Example I except that the polymerization of the monomers was allowed to continue for a period of about 79 hours so that the polymerization syrup had a viscosity of about 720 centipoise. The following constituents were shear mixed into 126 grams of the polymerization syrup:

1.5 grams of calcium hydroxide
1.0 grams of N,N-dimethyl acetoamide
2.1 grams of N-vinyl-2-pyrrolidone
1.5 grams of 2,4,7,9-tetramethyl-5-decyne-4,7-diol(126-86-3) ethylene glycol
15 grams of tris-(2-chloroethyl) phosphite
126 grams of tri-hydrate
14.4 grams of glass beads
6.04 grams of t-butyl peroxymaleic acid The resulting mixture foamed full and the filled foamed resinous composition exhibited excellent fire retardant properties. That is, the filled foamed resinous composition, when tested in a flame tunnel, qualified to be classified in the UL class. Further, the filled foamed resinous composition had a flame spread of 143.

EXAMPLE VII

A polymerization syrup was formulated in accordance with the procedure of Example I except that the polymerization of the monomers was allowed to continue for a period of about 79 hours so that the polymerization syrup had a viscosity of about 650 centipoise. 1.0 grams of an initiator, N,N-dimethyl acetoamide, was admixed with 115 grams of the polymerization syrup; and thereafter, 0.95 grams of 2,4,7,9-tetramethyl-5-decyne-4,7-diol ( 126-86-3) ethylene glycol and 0.3 grams of polyoxyethylene-polyoxypropylene glycol were admixed into the initiated polymerization syrup to form a homogenous initiated polymerization syrup.

1.3 grams of a foaming agent, i.e. calcium hydroxide, was then admixed into the homogeneous initiated polymerization syrup, followed by the addition of 5 grams of a fluorochemical surfactant. The resulting mixture was mixed until a homogenous blend was formed.

95 grams of a filler, terra alba gypsum, was then admixed into the homogeneous blend; once the initial filler had been substantially uniformily dispersed throughout the homogeneous blend, 4.8 grams of glass beads, was then added.

The resulting particulate filled polymerization mixture was catalyzed by the addition of 4 grams of t-butyl peroxymaleic acid. The catalyzed particulated filled polymerization mixture was then shear mixed at ambient temperature and pressure. The resulting blended mixture was then poured into a mold to foam and cure.

The foamed polymeric resin so produced exhibited excellent strength, fire resistance and further exhibited the ability to be nailed and to hold a screw.

From the foregoing, it is clear that acrylic/lactam monomer based polymeric resins prepared by the activation of the polymerization syrup of the present invention exhibit improved color, optical clarity and impact resistance, while at the same time possessing desired properties which allow such resin compositions to be foamed, filled with particulate fillers or cast into thick articles without air entrapment.

Thus, the present invention is well adapted to carry out the objects and attain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A method for producing a particulate filled article comprising:

admixing from about 10 to about 90 parts by weight of a particulate filler material with from about 90 to about 10 parts by weight of a polymerization syrup to form a substantially homogeneous blend, the polymerization syrup formed by the steps of:

admixing, at ambient temperature, from about 300 to about 2970 parts by volume of an acrylic monomer represented by the formula

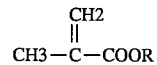

wherein R is an alkyl moiety containing 1 to about 18 carbon atoms, from about 30 to about 2700 parts by volume of a lactam monomer containing from 3 to about 12 carbon atoms in the lactam ring, from about 0.03 to about 40 parts by volume of a mercaptan chain transfer agent and from about 0.03 to about 40 parts by volume of a crosslinking agent capable of crosslinking the acrylic monomer and the lactam monomer so as to form a substantially homogeneous blend;

removing entrapped air from the homogeneous blend;
catalyzing the homogenous blend substantially void of entrapped air; and curing the catalyzed homogeneous blend.

2. The method for producing a particulate filled article of claim 1 wherein the filler material has a particle size in the range of from about 1 micron to about 200 microns.

3. The method of claim for producing a particulate filled article of claim 1 which further includes admixing into the polymerization an effective amount of an inhibitor capable of preventing additional crosslinking of polymeric constituents present in the polymerization syrup when the desired viscosity of the polymerization syrup has been achieved.

4. The method for producing a particulate filled article of claim 3 wherein the filler material has a particle size in the range of from about 1 micron to about 200 microns.

5. The method for producing a particulate filled article of claim 4 wherein the effective amount of the inhibitor present in the polymerization syrup is from about 0.05 to about 20 parts by volume.

6. The method for producing a particulate filled article of claim 5 wherein the inhibitor is selected from the group consisting of methylethylhydroquinone, 2,2-hydroxy-5-methylphenylbenzotriazole and alkyl phosphites.

7. The method for producing a particulate filled article of claim 3 which further includes incorporating into the polymerization syrup an effective amount of an ultraviolet light stabilizer.

8. The method for producing a particulate filled article of claim 3 which further includes incorporating into the polymerization syrup from about 1 to about 20 parts by volume of an ultraviolet light stabilizer.

9. The method for producing a particulate filled article of claim 3 which further includes incorporating into the polymerization syrup an effective minor amount of an internal mold release agent.

10. The method for producing a particulate filled article of claim 3 wherein the acrylic monomer present in the polymerization syrup is methyl methacrylate and the lactam monomer present in the polymerization syrup is $\epsilon$-caprolactam.

* * * * *

UNITED STATES PATENT AND TRADEMARK OFFICE
CERTIFICATE OF CORRECTION

PATENT NO.   : 5,512,627
DATED        : April 30, 1996
INVENTOR(S)  : Edwards

Page 1 of 2

It is certified that error appears in the above-indentified patent and that said Letters Patent is hereby corrected as shown below:

Cover page, title, please delete "PRODUCTION" and substitute therefor --PRODUCING--.

Cover page, ABSTRACT, line 3, please delete "heath" and substitute therefor --heat--.

Column 1, line 2, please delete "PRODUCTION" and substitute therefor --PRODUCING--.

Column 1, line 52, please delete "composition" and substitute therefor --compositions--.

Column 4, line 50, please delete "phosphites" and substitute therefor --phosphite--.

Column 4, line 66, please delete ")benzotriazole," and substitute therefor --benzotriazole--.

Column 4, line 66, please delete "benzotriazol-2-YL)" and substitute therefor --benzotriazole-2-yl)--.

UNITED STATES PATENT AND TRADEMARK OFFICE
CERTIFICATE OF CORRECTION

PATENT NO. : 5,512,627
DATED : April 30, 1996
INVENTOR(S) : Edwards

It is certified that error appears in the above-indentified patent and that said Letters Patent is hereby corrected as shown below:

Column 7, line 8, please delete "particulated" and substitute therefor --particulate--.

Column 8, line 8, please delete "f0foamable" and substitute therefor --foamable--.

Column 12, line 17, please delete "particulated" and substitute therefor --particulate--.

Column 13, line 5, please delete "of claim".

Signed and Sealed this

Nineteenth Day of August, 1997

*Attest:*

BRUCE LEHMAN

*Attesting Officer*     *Commissioner of Patents and Trademarks*